(No Model.)

C. RUSTERHOLTZ.
WHEEL HARROW.

No. 372,489. Patented Nov. 1, 1887.

Witnesses.
G. J. Mead,
F. J. Bassett

Inventor.
Christian Rusterholtz.
Per J. C. Sturgeon
Att'y.

UNITED STATES PATENT OFFICE.

CHRISTIAN RUSTERHOLTZ, OF FAIRVIEW, PENNSYLVANIA.

WHEEL-HARROW.

SPECIFICATION forming part of Letters Patent No. 372,489, dated November 1, 1887.

Application filed August 3, 1887. Serial No. 246,070. (No model.)

*To all whom it may concern:*

Be it known that I, CHRISTIAN RUSTERHOLTZ, a citizen of the United States, residing at Fairview, in the county of Erie and State of Pennsylvania, have invented certain new and useful Improvements in Wheel-Harrows; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in wheel-harrows hereinafter set forth and explained in the specification and claim, and illustrated in the accompanying drawings, in which—

Figure 1:
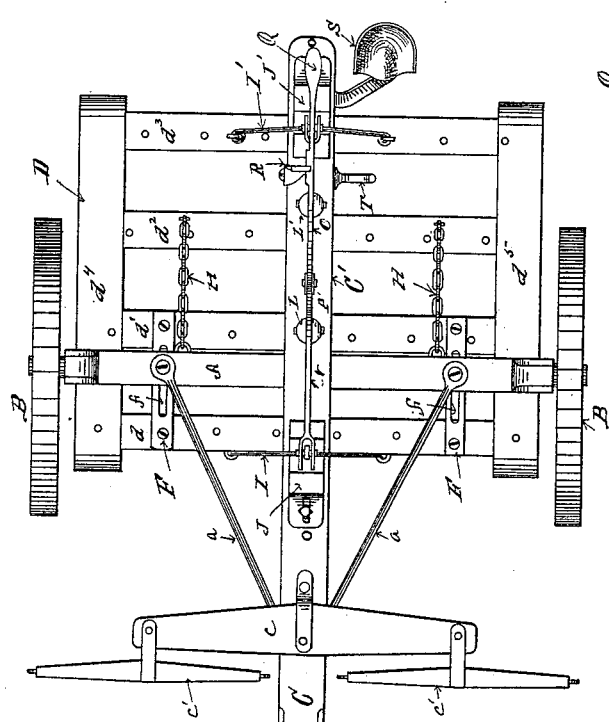
Figure 2:
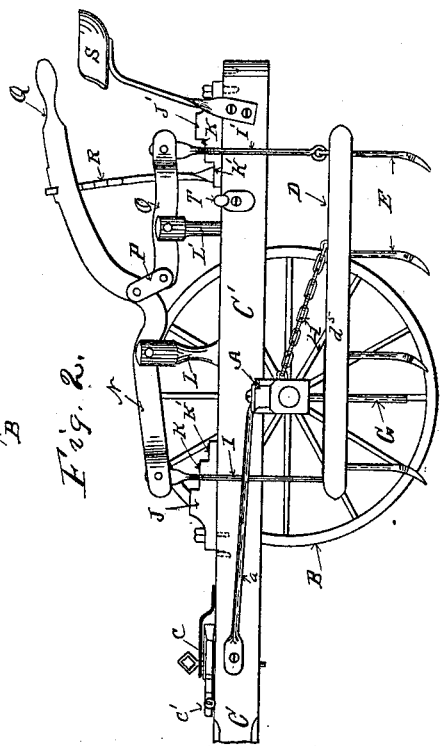
Figure 3:
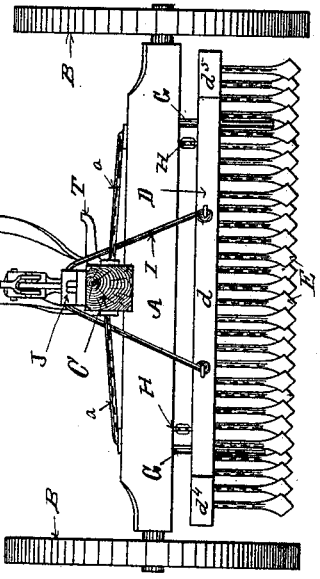

Figure 1 is a top or plan view of my improved wheel-harrow. Fig. 2 is a side elevation of same. Fig. 3 is a front end view in elevation of same.

Like letters refer to like parts in all the figures.

In constructing my improved wheel-harrow I make an axle, A, upon which I mount wheels B B, preferably of, say, three and one-half feet in height. To the axle A, I secure a tongue, C, provided with whiffletrees $c$ $c'$, to which a team may be secured for drawing the harrow mechanism. The end C' of the tongue C, I extend back of the axle A, so as to form the frame-work of the device. However, other forms of frame-work might be used; but I prefer the form shown and described.

The harrow D, I construct, preferably of rectangular shape, of cross-pieces $d$ $d'$ $d^2$ $d^3$ and side sections, $d^4$ and $d^5$, framed or bolted firmly together, the size of the harrow being such that it will operate between the wheels B B under the axle A. The harrow is provided with teeth E, secured in the frame thereof in the usual and ordinary manner. I connect this harrow with the frame-work A C' by means of downwardly-projecting guide-rods G G, secured in the axle A, which guide-rods operate in the slotted plates F F, secured upon the cross-bars $d$ $d'$ of the harrow D, these guide-rods operating to control the lateral motion of the harrow D in relation to the wheels B B. I also secure to the back of the axle A draft-chains H H, which extend to and are secured to the cross-bar $d^2$ of the harrow D, and for the purpose of controlling the vertical movement of the harrow D, I secure stirrups I to the front cross-bar, $d$, and I' to the back cross-bar, $d^3$, of the harrow D, this stirrup I extending upward and over the tongue C, and the stirrup I' upward and over the rear end of the frame-work C', where they rest upon the blocks J and J', which are adjustably secured upon the top of the tongue C and frame-work C'. These blocks J and J' are provided with steps K and K', by means whereof the depth at which the harrow-teeth will enter the ground is regulated, the stirrups I and I' resting thereon when the harrow D is in operation.

Upon the frame-work C', I place standards L L', upon which I mount the compound levers N O, which levers are coupled together by a link, P, the end of the lever N being secured to the top of the stirrup I and the lever O to the top of the stirrup I'. A handle, Q, is also provided, adapted to operate the levers N O and thereby raise or lower the harrow D, as desired. A rack-bar, R, is also secured to the frame-work C', into which the handle Q may be secured when desired, so as to support the harrow D when raised out of the ground. A seat, S, and foot-rest T are also secured to the frame-work C', upon which the operator may ride, if desired. In operation the harrow D, in transporting it from place to place, is raised above the ground by means of the levers N O, acting upon the stirrups I I' and secured in such position by the handle Q, engaging with the rack-bar R; and when in operation, the handle Q being released from the rack-bar R, the teeth E sink into the ground until the stirrups I I' come into contact with and rest upon the blocks J J', the draft-chains H H drawing the harrow along with the frame-work of the machine.

It will readily be seen that the strain is brought to bear upon the frame-work of the machine in such shape that it is substantially balanced upon the wheels of the machine.

Having thus described my invention, so as to enable others to construct and operate the same, what I claim as new, and desire to secure by Letters Patent of the United States, is—

The combination, in a wheel-harrow, of the wheels B B, the axle A, the guide-rods G G, the frame C', the lever mechanism N O P Q, and the blocks J J' on said frame, substantially as shown and described, with the harrow D, having the slotted plates F F thereon, the stirrups I I', and the draft-chains H H, connecting said harrow with the axle, substantially as and for the purpose set forth.

In testimony whereof I affix my signature in presence of two witnesses.

CHRISTIAN RUSTERHOLTZ.

Witnesses:
G. J. MEAD,
WM. P. HAYES.